No. 663,800. Patented Dec. 11, 1900.
H. G. VIRGIN.
CLAY SCREENING APPARATUS.
(Application filed Aug. 30, 1900.)
(No Model.)
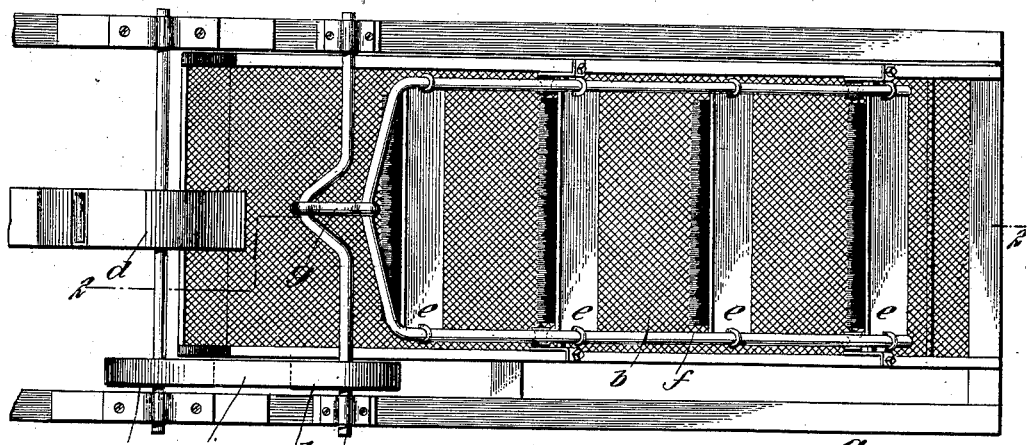
Fig. 1.
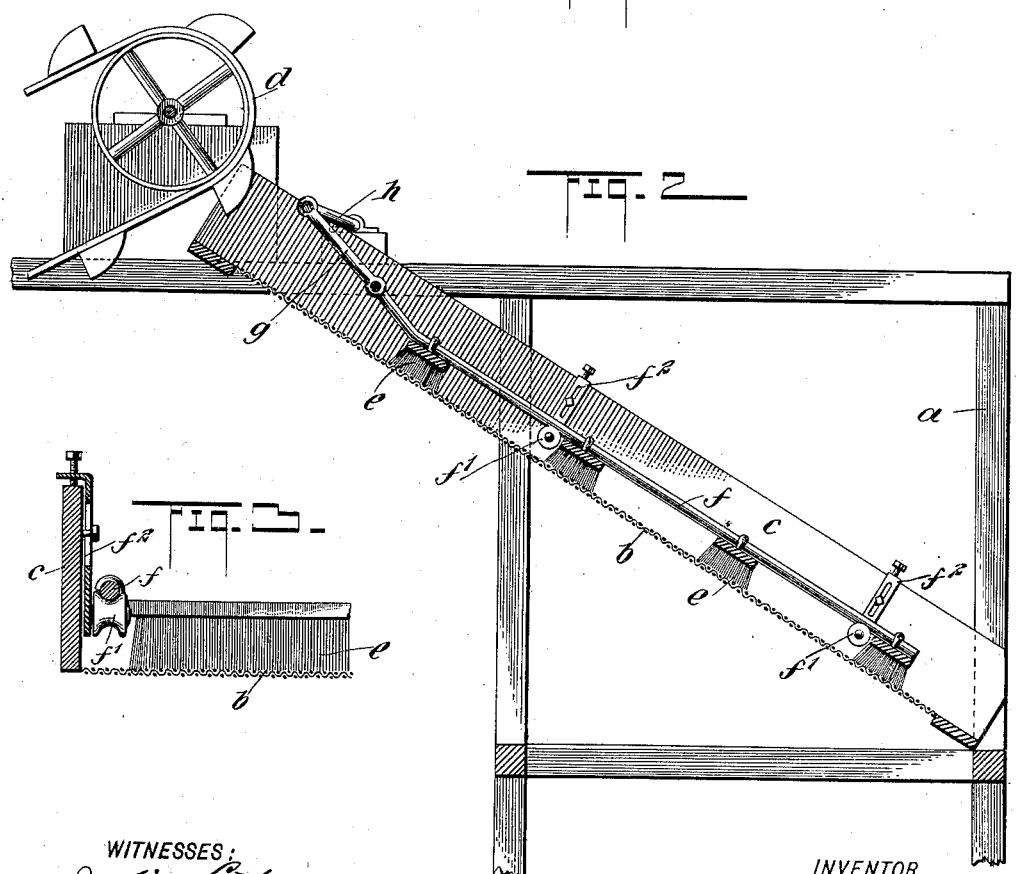
Fig. 2.
Fig. 3.
WITNESSES:
INVENTOR
Horace G. Virgin.
BY
ATTORNEYS

UNITED STATES PATENT OFFICE.

HORACE G. VIRGIN, OF PENRITH, WEST VIRGINIA.

CLAY-SCREENING APPARATUS.

SPECIFICATION forming part of Letters Patent No. 663,800, dated December 11, 1900.

Application filed August 30, 1900. Serial No. 28,589. (No model.)

*To all whom it may concern:*

Be it known that I, HORACE G. VIRGIN, a citizen of the United States, and a resident of Penrith, in the county of Hancock and State of West Virginia, have invented a new and Improved Clay-Screening Apparatus, of which the following is a full, clear, and exact description.

The purpose of this invention is to provide means for screening clay used in brick-making; and to this end the invention comprises an inclined screen with a brush or a gang of brushes arranged therein and connected with means for reciprocating them on the screen, so that the fine clay is sieved therethrough and the lumps of coarse clay are caused to gravitate down the screen into a suitable receptacle at the lower end thereof.

This specification is the disclosure of one form of the invention, while the claim defines the actual scope thereof.

Reference is to be had to the accompanying drawings, forming a part of this specification, in which similar characters of reference indicate corresponding parts in all the views.

Figure 1 is a plan view of the invention. Fig. 2 is a vertical section on the line 2 2 of Fig. 1, and Fig. 3 is a detail section showing the means for mounting the brushes.

The machine is provided with a suitable framing $a$ and has an inclined screen $b$ sustained thereon, the screen being provided with imperforate side walls $c$, forming a sort of trough through which the clay passes. The clay may be delivered to the upper end of the sieve by a conveyer $d$ of any suitable form. As here shown, four transversely-disposed brushes $e$ are arranged on the sieve and connected together by a framing $f$, which has a link $g$ pivotally attached thereto. This link has its opposite end connected with a crank-shaft $h$, mounted in the framing $a$, and the crank-shaft is adapted to have a rotary movement imparted thereto. The longitudinal side rails of the frame $f$ are supported to reciprocate on rollers $f'$, adjustably held on the side walls $c$ by brackets $f^2$. By these means the pressure of the brushes on the screen may be regulated. If desired, the shaft $h$ may be connected with the conveyer by means of a belt $i$, passing over pulleys $k$ and $l$, respectively connected with the conveyer and crank-shafts.

The clay being delivered to the upper end of the screen and the brushes being driven reciprocally on the screen, the fine particles of clay will be forced through and the screen kept clean and free from clogging. The coarse particles of the clay will be precipitated down to and from the lower end of the screen.

Having thus described my invention, I claim as new and desire to secure by Letters Patent—

A clay-screening apparatus, having an inclined sieve, a gang of brushes mounted on the sieve, a framing connecting the brushes together, a link pivotally connected to the framing, and a revolubly-driven crank-shaft to which the link is also pivotally connected, for the purpose specified.

In testimony whereof I have signed my name to this specification in the presence of two subscribing witnesses.

HORACE G. VIRGIN.

Witnesses:
JOHN R. DOUCHOR,
AMEOR S. COOPER.